(12) United States Patent
Wang et al.

(10) Patent No.: US 11,271,811 B2
(45) Date of Patent: Mar. 8, 2022

(54) PROFILE EDITING SYSTEM

(71) Applicants: Chi-Hsiang Wang, Taichung (TW); Wan-Yu Hsien, Taichung (TW)

(72) Inventors: Chi-Hsiang Wang, Taichung (TW); Wan-Yu Hsien, Taichung (TW)

( * ) Notice: Subject to any disclaimer, the term of this patent is extended or adjusted under 35 U.S.C. 154(b) by 0 days.

(21) Appl. No.: 16/573,754

(22) Filed: Sep. 17, 2019

(65) Prior Publication Data

US 2020/0092170 A1 Mar. 19, 2020

(30) Foreign Application Priority Data

Sep. 17, 2018 (TW) ................. 107132688

(51) Int. Cl.
*H04L 12/24* (2006.01)
*H04L 41/08* (2022.01)
*G06F 16/958* (2019.01)
*H04L 41/22* (2022.01)
*H04L 67/303* (2022.01)

(52) U.S. Cl.
CPC ........ *H04L 41/0883* (2013.01); *G06F 16/958* (2019.01); *H04L 41/22* (2013.01); *H04L 67/303* (2013.01)

(58) Field of Classification Search
CPC ..... H04L 41/0883; H04L 41/22; H04L 67/30; H04L 67/303; H04L 67/306; H04L 12/2814; G06F 16/958; H05B 47/175
See application file for complete search history.

(56) References Cited

U.S. PATENT DOCUMENTS

| | | | |
|---|---|---|---|
| 9,270,761 B1 * | 2/2016 | Logue | G08B 17/10 |
| 2011/0252131 A1 * | 10/2011 | Karaoguz | H04L 41/22 |
| | | | 709/224 |
| 2016/0063853 A1 * | 3/2016 | Mi | H04L 12/2829 |
| | | | 340/12.5 |
| 2017/0285596 A1 * | 10/2017 | Hunt | G05B 19/042 |
| 2018/0063927 A1 * | 3/2018 | Abraham | H05B 47/175 |
| 2018/0139069 A1 * | 5/2018 | Rawlins | H04L 12/282 |
| 2018/0167516 A1 * | 6/2018 | Warrick | G10L 15/26 |
| 2019/0058711 A1 * | 2/2019 | Zhu | H04W 4/70 |
| 2019/0342175 A1 * | 11/2019 | Wan | G06F 9/543 |

FOREIGN PATENT DOCUMENTS

| | | |
|---|---|---|
| TW | M490593 U | 11/2014 |
| TW | M492001 U | 12/2014 |
| TW | M566570 U | 9/2018 |

\* cited by examiner

*Primary Examiner* — Oanh Duong
(74) *Attorney, Agent, or Firm* — Muncy, Geissler, Olds & Lowe, P.C.

(57) ABSTRACT

The present invention provides a profile editing system, including: a plurality of devices; a plurality of device control modules, configured to respectively control the devices; and a profile control module, configured to record control settings that are preset by the device control modules for the devices as a profile, so that a user may enable the profile to make the devices work by using the control settings recorded in the profile, to form environmental conditions preset by the user.

12 Claims, 3 Drawing Sheets

PROFILE EDITING SYSTEM

BACKGROUND OF THE INVENTION

1. Field of the Invention

The present invention relates to electrical control technologies, and in particular, to a profile editing system for controlling a plurality of devices to work in preset working manners.

2. Description of the Related Art

With the development of internet of things (IoT) technologies, increasingly varied and numerous electrical devices are linked via networks, leading to growing complexity. A use manner in which a profile preset in a control system is used to make different electrical devices separately work according to preset working states to build environmental conditions preset by a user can significantly reduce the time required for the user to perform operation control, so that great convenience is provided in use.

In the prior art, Digital Addressable Lighting Interface (DALI) technologies enable a user to set the brightness of different light fixtures in different profiles to meet a current use requirement. The profiles include, for example, a reading profile suitable for reading, and a theater profile suitable for movie watching. The DALI technologies are only applicable to the control of light devices but are of little use in general control of different types of electrical appliances, for example, general control of light devices, electric blinds, stereos, and televisions, and as a result become less and less adequate for increasingly complex IoT environments.

SUMMARY OF THE INVENTION

Therefore, a main objective of the present invention is to provide a profile editing system that can cover control settings of different types of controlled devices to satisfy the requirements of users in IoT environments.

In view of this, to achieve the foregoing objective, the present invention provides a profile editing system, including: a plurality of devices; a plurality of device control modules, configured to respectively control the devices; and a profile control module, configured to record control settings that are preset by the device control modules for the devices as a profile, so that a user may enable the profile to make the devices work by using the control settings recorded in the profile, to form environmental conditions preset by the user. A major technical feature of the present invention lies in that the profile control module only records control settings of device control modules whose settings are performed as a part of a profile when the profile is being edited, but does not record information of device control modules whose settings are not performed in the profile, so as to simplify profile recording. Moreover, when the control settings are provided as the settings of the device control modules are separately performed, identification codes of the device control modules are also provided.

In other words, when the profile is being edited, the profile is first initialized, respective control settings of all or some of the device control modules are then respectively set, the device control modules that are set transfer the control settings and identification codes thereof to the profile control module, the profile control module records the control settings and the identification codes in the profile, and when only some of the device control modules are set, only the control settings of the device control modules that are set are recorded in the profile.

The device control modules and the profile control module are respectively wall control switches.

The device control modules need to communicate with the profile control module.

The device control modules and the profile control module are respectively graphical user interfaces (GUI).

DETAILED DESCRIPTION OF THE PREFERRED EMBODIMENTS

Figure 1:
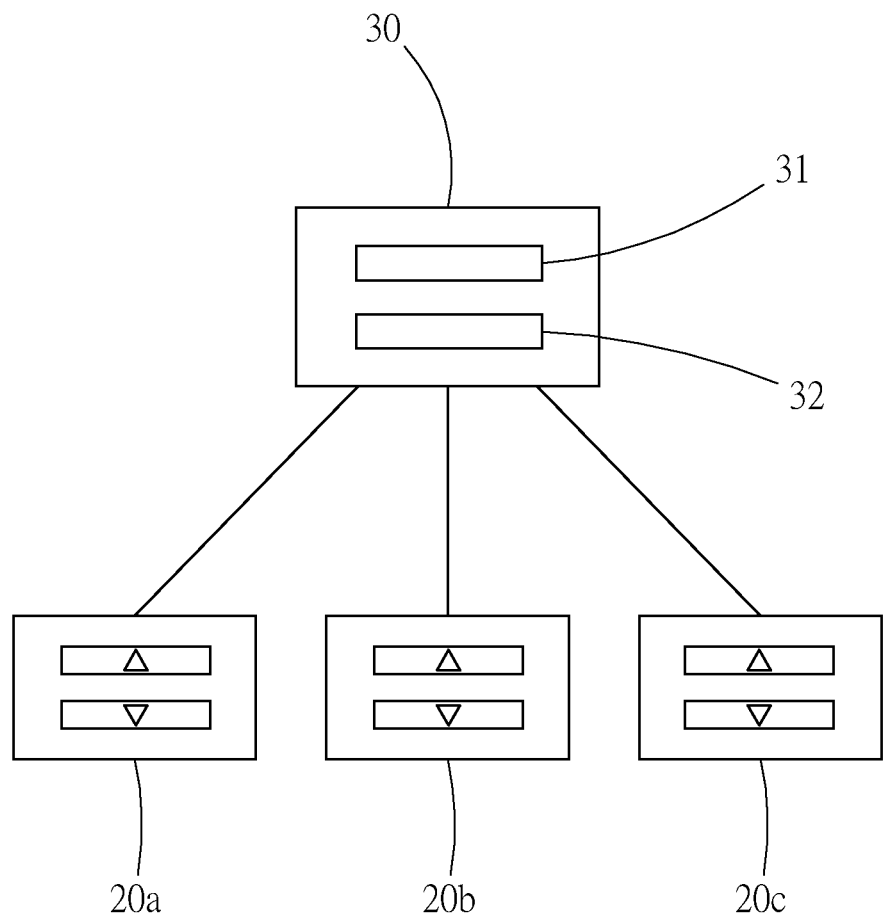
FIG. 1 is a schematic diagram according to a first preferred embodiment of the present invention.

First, referring to FIG. 1, the apparatus part of the profile editing system provided in the first preferred embodiment of the present invention mainly includes a plurality of devices, a plurality of device control modules (20a), (20b), (20c), and a profile control module (30).

The devices are, for example, dimmable light fixtures, electric blinds or home cinema devices. More types of smart home appliances will emerge with the development of IoT technologies, and any of the devices may be the device discussed in the present invention. In this embodiment, for example, the device is a dimmable light fixture or an electric blind. Such devices are already disclosed in the prior art, and are therefore not described and not disclosed in the drawings.

A quantity of the device control modules usually corresponds to a quantity of devices, and the individual device control modules respectively control linked devices. For example, the device control modules (20a), (20b) shown in FIG. 1 control different dimmable light devices, and the device control module (20c) is configured to control an electric blind device. In this embodiment, the device control modules (20a), (20b), (20c) are respectively physical wall control switches and respectively have an identification code for recognizing an identity.

The profile control module (30) also exists in the form of a physical wall control switch, communicates with the device control modules (20a), (20b), (20c) in a wired or wireless manner, and has a plurality of profile buttons (31), (32). The profile buttons (31), (32) are used as control switches of the profile control module (30) that are used by a user to enable or disable a specific profile, and are used to control a start setting and an end setting for editing of a specific profile.

Figure 2:
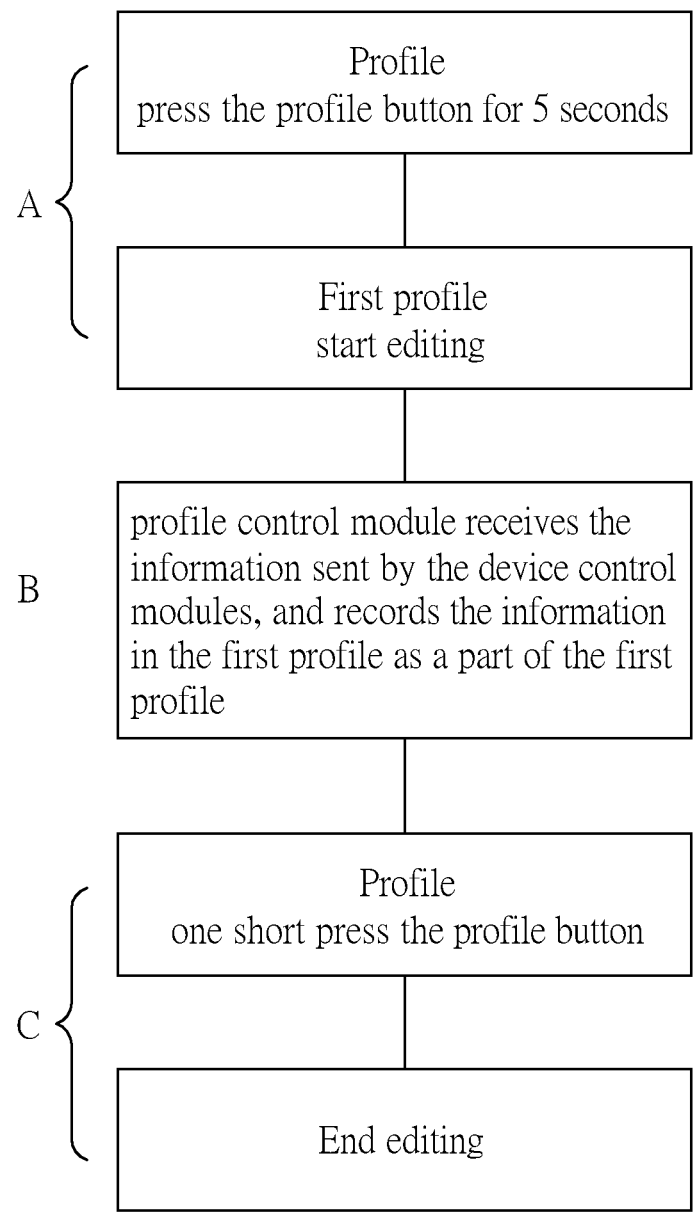
FIG. 2 is a schematic diagram of editing a profile according to the first preferred embodiment of the present invention.

Referring to FIG. 2, in this embodiment, the profile is edited by using the following steps:

A. Start a Procedure of Editing a Specific Profile

Before editing, a profile button, for example, the profile button (31), to be edited is first operated in a specific operation manner to initialize a first profile corresponding to the profile button (31) and allow editing of the first profile and allow receiving of information sent by the device control modules.

B. Edit

The profile control module (30) receives the information sent by the device control modules, and records the information in the first profile as a part of the first profile. The content of the information received by the profile control module at least includes identification codes of the device control modules that send the information and control settings preset for the controlled devices, and records are kept in the profile control module (30).

For example, in an editing state of the first profile, an operator may adjust a dimming value of the controlled dimmable light device on the device control module (20a), and adjust an opening degree of the controlled electric blind on the device control module (20c). However, no operation is performed on the device control module (20b). In this case, at the same time when the device control module (20a) and the device control module (20c) have adjusted setting values, the adjusted control settings and identification codes of the device control module (20a) and the device control module (20c) are respectively sent to the profile control module (30). The profile control module (30) records the adjusted control settings and the identification codes in the first profile. However, no setting operation is performed on the device control module (20b), and no information packet is generated. In this case, the control settings recorded in the first profile do not include the control setting related to the device control module (20b).

C. End Editing

After the device control module have been separately set, the user then operates the profile button (31) in a specific operation manner to complete the editing of the profile.

A specific operation manner of the button used to start or end editing in Step A and Step C may be arbitrarily selected. For example, in step A, a long press lasting 5 seconds is used as an operation manner to start editing, and in step C, one short press is used as an operation manner to end editing. The present invention is not limited thereto.

Figure 3:
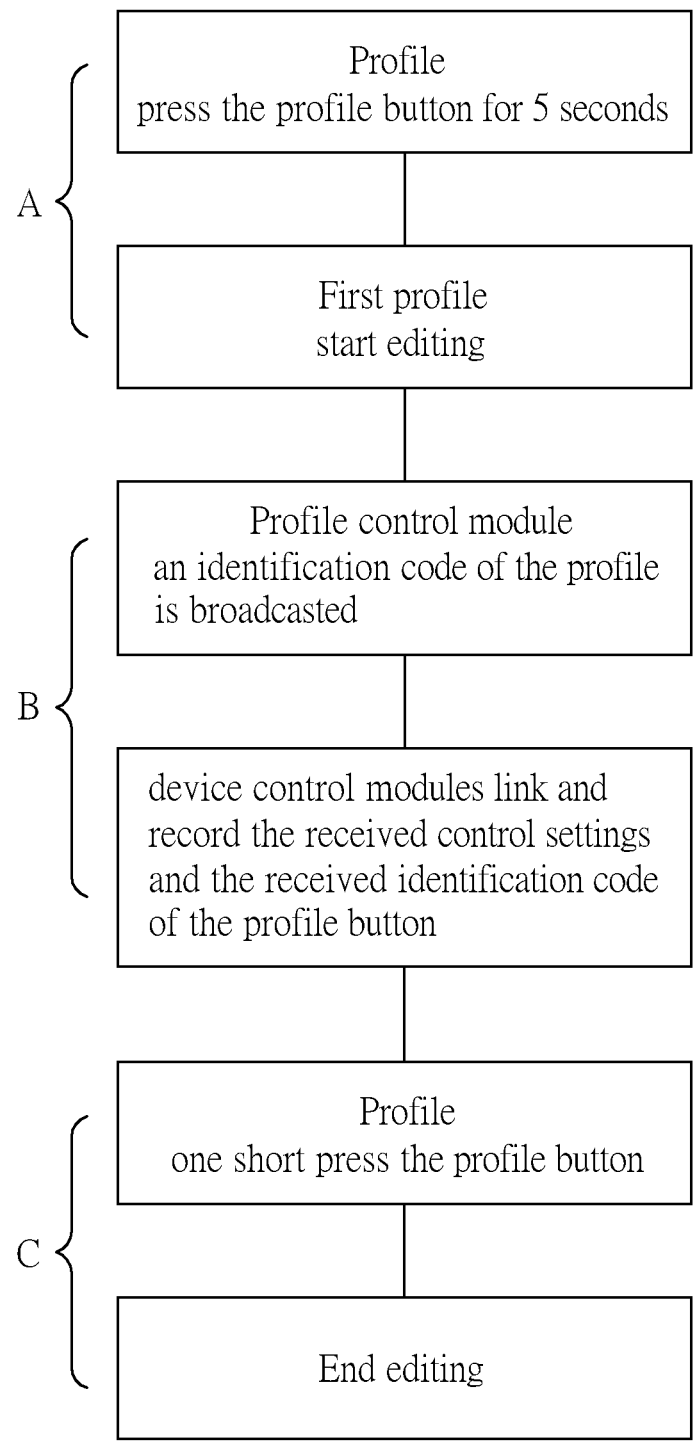
FIG. 3 is a schematic diagram of editing a profile according to a second preferred embodiment of the present invention.

Next, referring to FIG. 3, a profile editing system provided in a second preferred embodiment of the present invention is substantially not different from that disclosed in the first preferred embodiment disclosed above in physical structure. In terms of methods, this embodiment and the first preferred embodiment disclosed above are apparently the same in actions of editing a profile, but are different in recording of control settings. Specifically:

In this embodiment, when the procedure of starting editing in step A is performed, before editing is started, an identification code of a profile button to be edited is broadcasted or sent by using a similar technology to be received by the device control modules. Therefore, when the procedure of editing in Step B is performed, if receiving control settings, device control modules link and record the received control settings and the received identification code of the profile button, and a device control module that does not receive a control setting performs no action. Therefore, after editing is ended in Step C, the user presses the profile button that is edited, for example, presses the profile button (31) in FIG. 1, so that the profile control module sends an instruction for enabling or disabling the first profile and the identification code of the profile button (31), and the device control modules that receive the instruction perform a control setting that conforms to the identification code of the profile button (31) to make the devices work. Therefore, when a control setting that conforms to the identification code of the profile button (31) does not exist in the record of the device control module, the device controlled by the device control module performs no action.

By means of the profile editing system provided in the present invention, a plurality of different types of devices may be controlled in a single profile. Compared with the prior art, the present invention is more suitable for IoT applications, and may be applied more widely.

It should finally be noted that the device control modules and profile control module discussed in the present invention exist only in the form of physical wall control switch objects in the embodiments disclosed above. However, during application, the physical switch objects may be replaced with virtual switch buttons by using a touch panel, and the device control modules and profile control module may respectively exist in the form of a GUI. In this way, the profile may also be edited on smart handheld apparatus such as a mobile phone or a tablet. Similar replacements or simple changes still fall within the protection scope of the present invention.

(20a), (20b), (20c) Device control module
(30) Profile control module
(31), (32) Profile button

What is claimed is:

1. A profile editing system, comprising:
   a plurality of devices;
   a plurality of device control modules being respectively physical wall control switches and linked to the devices, the device control modules being configured to respectively control the devices; and
   a profile control module being a physical wall control switch and communicating with the device control modules in a wired or wireless manner, and configured to record control settings that are preset by the device control modules for the devices as a profile, to make the devices work by using the control settings recorded in the profile, the profile including multiple sets of different setting scenarios based on the recorded control settings for the device control modules,
   wherein
   the device control modules are independent form each other and from the profile control module;
   the plurality of devices include at least one of a dimmable light fixture and an electric blind;
   the device control modules respectively have an identification code;
   the profile control module is configured to be operated by a user to activate and deactivate the profile to control a start setting and an end setting for editing the profile;
   when the profile is being edited:
   step 1: the profile is first initialized,
   step 2: respective control settings of all or some of the device control modules are then respectively set,
   step 3: the device control modules that are set transfer the control settings and identification codes thereof to the profile control module, and
   step 4: the profile control module records the control settings and the identification codes in the profile, and when only some of the device control modules are set, only the control settings of the device control modules that are set are recorded in the profile; and
   the profile includes adjustment of a dimming value of a controlled dimmable light fixture or adjustment of an opening degree of a controlled electric blind.

2. The profile editing system according to claim 1, wherein the device control modules and the profile control module are respectively wall control switches.

3. The profile editing system according to claim 2, wherein the device control modules need to communicate with the profile control module.

4. The profile editing system according to claim 1, wherein the device control modules and the profile control module are respectively graphical user interfaces (GUI).

5. The profile editing system according to claim 1, wherein the device control modules and the profile control module are respectively touch panels.

6. The profile editing system according to claim 5, wherein the device control modules and the profile control module are respectively graphical user interfaces (GUI).

7. A profile editing system, comprising:
a plurality of devices;
a plurality of device control modules being respectively physical wall control switches and linked to the devices, the device control modules being configured to respectively control the devices; and
a profile control module being a physical wall control switch and communicating with the device control modules in a wired or wireless manner, having at least one profile, and configured to make all or some of the devices work in a preset manner, the profile including multiple sets of different setting scenarios based on recorded control settings for the device control modules, wherein
the device control modules are independent form each other and from the profile control module;
the plurality of devices include at least one of a dimmable light fixture and an electric blind;
the profile control module is configured to be operated by a user to activate and deactivate the profile to control a start setting and an end setting for editing the profile; the profile has an identification code;
when the profile is being edited:
step 1: the profile control module is first used to generate an editing signal,
step 2: an identification code of the profile is broadcasted, and
step 3: when all or some of the device control modules are respectively set externally to change respective control settings of the device control modules on the devices, the control settings are respectively linked to the identification code of the profile and are respectively recorded in the device control modules that are set; and
the profile includes adjustment of a dimming value of a controlled dimmable light fixture or adjustment of an opening degree of a controlled electric blind.

8. The profile editing system according to claim 7, wherein the device control modules and the profile control module are respectively wall control switches.

9. The profile editing system according to claim 8, wherein the device control modules need to communicate with the profile control module.

10. The profile editing system according to claim 7, wherein the device control modules and the profile control module are respectively graphical user interfaces (GUI).

11. The profile editing system according to claim 7, wherein the device control modules and the profile control module are respectively touch panels.

12. The profile editing system according to claim 11, wherein the device control modules and the profile control module are respectively graphical user interfaces (GUI).

* * * * *